3,398,277
ELECTRO-OPTICAL ALTIMETER
Dwight L. Randall, 312 N. Edison St.,
Arlington, Va. 22203
Filed Nov. 30, 1965, Ser. No. 510,707
7 Claims. (Cl. 250—43.5)

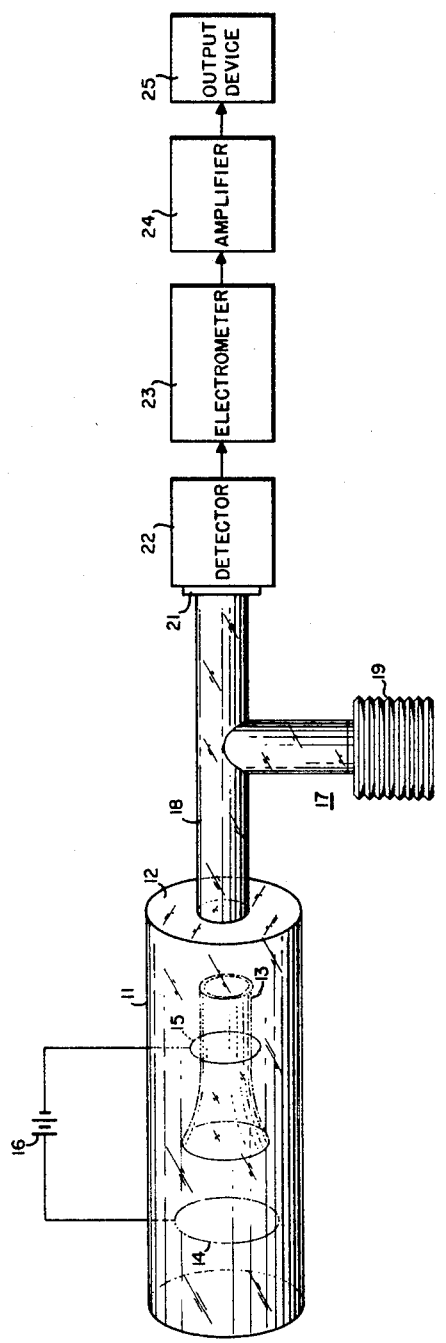

ABSTRACT OF THE DISCLOSURE

An altimeter in which ultraviolet light is directed through a closed chamber, the volume of which varies with altitude. The closed chamber is filled with a gas which absorbs ultraviolet light in an amount proportional to gas density. Since the density of the gas varies as the chamber volume varies with altitude, detection and measurement of the ultraviolet light emerging from the chamber is indicative of altitude.

The invention described herein may be manufactured and used by or for the Government of the United States of America for governmental purposes without the payment of any royalties thereon or therefor.

The present invention relates generally to altimeters and more particularly to an altimeter wherein the intensity of radiation received through a gas in an enclosed pressure-sensitive container is indicative of altitude.

In the past, Lyman-alpha radiation sources and nitric oxide detectors have been used to transmit radiation across a measuring path in humidiometers for measuring the water vapor content of air. The water vapor content of the air is a function of the amount of radiation passing through the air. In the instant invention, the general principles of the Lyman-alpha humidiometer have been employed to produce a device for providing indications of altitude by confining a gas, such as oxygen, in a pressure-sensitive container coupled in and enclosing the measuring path. Variations in pressure due to changes in altitude cause changes in the density of the oxygen confined in the container. Consequently, the changes in density of the oxygen cause changes in the attenuation of the emitted radiation. A signal is produced by the radiation detector which is proportional to the amount of radiation impinging upon the detector and this signal is proportional to the density of the oxygen in the enclosed container which in turn is proportional to altitude. An output device is provided which can be calibrated to give direct altitude readings.

Prior art altimeters usually employ mechanical devices having a partially evacuated capsule with means for preventing the capsule from collapsing. The change in thickness of the capsule is usually mechanically connected to a pointer with an indicator for providing indications of pressure, density, or pressure height as the pointer swings over a dial face. The mechanical altimeters have a speed of response which is limited by the mechanical movements. In addition, the signal produced by the pressure-sensitive capsule is not readily amplified.

The general purpose of the present invention is to provide a Lyman-alpha altimeter which embraces all the advantages of prior altimeters and which possesses none of their disadvantages. In order to attain this, the present invention contemplates an improved altimeter having a Lyman-alpha radiation source for emitting radiation of 1216 Angstroms through a container which is pressure-sensitive and which contains oxygen or any other suitable gas, the density of which varies with pressure. A nitric oxide radiation detector is provided for receiving the radiation emitted through the confined oxygen for providing a signal proportional to the amount of radiation impinging upon the detector. An electrometer tube is coupled to the detector for sensing the ionization current of the nitric oxide detector, and an amplifier is coupled to the electrometer tube for producing a signal of proper gain and phase. An indicating device is coupled to the amplifier for producing an indication of altitude in terms of the radiation received by the detector. The indication is related to the density of the oxygen in the container and is calibrated to give a direct indication of altitude. By means of this invention, altitude measurements can be made utilizing principles of radiation and electricity without the need for extensive mechanical elements and movements. Hence greater sensitivity and signal amplification is available, as well as a rapid response to altitude changes.

It is therefore an object of the present invention to provide a new and improved altimeter.

Another object is to provide a highly sensitive altimeter having a minimum of mechanical movement.

A further object is to provide a novel altimeter for providing altitude measurements having greater accuracy and higher speed of response than prior altimeters.

Other objects and many of the attendant advantages of this invention will be readily appreciated as the same becomes better understood with reference to the following detailed description when considered in connection with the accompanying drawing and wherein:

The figure is a schematic diagram of the Lyman-alpha altimeter of this invention.

Referring now to the drawing, there is shown an altimeter having a Lyman-alpha radiation source comprising a hydrogen discharge tube 11 which emits ultraviolet light of approximately 1216 Angstroms through a lithium fluoride window 12. The hydrogen tube 11 produces Lyman-alpha radiation by ionization of hydrogen gas which flows through a focusing tube 13 supported within the hydrogen tube. Electrodes 14 and 15 are connected to a battery 16 which produces ionization in a flow of gas resulting in a glow discharge. The glow discharge, which is Lyman-alpha radiation, is directed through lithium fluoride window 12 through glass tube 18 having a suitable pressure-sensitive element 19 such as a bellows coupled thereto. Tube 18 and pressure-sensitive expansible member 19 comprise an enclosed fluid-tight pressure-sensitive container sealed at window 12 of hydrogen tube 11 and at window 21 of nitric oxide detector 22. A suitable impedance matching device 23 such as an electrometer monitors the ionization current of nitric oxide detector 22 which in turn is coupled through an amplifier 24 to an output device 25.

The invention thus provides an altimeter comprising a hydrogen tube, or any other suitable radiation source, which radiates at 1216 Angstroms across a confined amount of oxygen, or other suitable gas, in a pressure-sensitive container to a nitric oxide detector coupled to a measuring network. Radiation from the hydrogen tube is directed through a lithium fluoride window into the nitric oxide detector tube. By means of photoionization, the detected radiation causes current to flow in the electronic metering circuit coupled to the nitric oxide detector tube in proportion to the density of the gas. The device provides a highly sensitive means for measuring altitude with a minimum of mechanical movement by utilizing the radiation attenuation characteristics of a gas.

While the invention has been described with oxygen confined in the present-sensitive enclosed container, it is to be understood that other gases may be used in the measuring path. Also, the radiation source need not be a hydrogen tube. Other gases such as helium or krypton may be used in the radiation tube. Likewise, other gases could be used in an ion chamber detector instead of nitric oxide for other absorption band regions. In addition, the absorption band employed for observing density changes in the measuring path gas may be extended by utilizing materials other than lithium fluoride in the windows of the radiation source and the detector.

Obviously many other modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An altimeter comprising:
   an enclosed pressure-sensitive container,
   a gas within said container and having the property of absorbing electromagnetic radiation having wavelengths in the region of Lyman-alpha,
   a radiation source for emitting electromagnetic radiation having wavelengths in the region of Lyman-alpha through the gas in said container, and
   a detector for receiving the radiation emitted through said gas for providing a signal proportional to the amount of radiation impinging upon said detector,
   wherein the density of said gas varies with changes in altitude to attenuate the emitted radiation in accordance with altitude.

2. An altimeter as set forth in claim 1 wherein said radiation source comprises a hydrogen discharge tube for emitting Lyman-alpha radiation of approximately 1216 Angstroms.

3. An altimeter as set forth in claim 2 wherein said detector is a nitric oxide detector.

4. An altimeter as set forth in claim 3 further including:
   an impedance matching device coupled to said detector for monitoring the ionization current of the nitric oxide detector,
   indicating means for providing an indication proportional to altitude, and
   an amplifier coupled between said impedance matching device and said indicating means.

5. An altimeter as set forth in claim 4 wherein said impedance matching device comprises an electrometer.

6. An altimeter as set forth in claim 5 wherein said indicating means provides an indication of altitude in terms of the density of the gas confined within said container.

7. An altimeter as set forth in claim 6 wherein said confined gas is oxygen.

References Cited
UNITED STATES PATENTS

| | | | |
|---|---|---|---|
| 2,790,324 | 4/1957 | Babb. | |
| 2,813,981 | 11/1957 | Friedman | 250—83.3 X |
| 2,901,625 | 8/1959 | Friedman. | |
| 2,925,007 | 2/1960 | Silver | 230—43.5 X |
| 3,025,396 | 3/1962 | Laughlin | 250—43.5 |
| 3,180,990 | 4/1965 | Randall et al. | 250—43.5 X |

RALPH G. NILSON, *Primary Examiner.*

A. B. CROFT, *Assistant Examiner.*